US007383986B2

(12) United States Patent
Specht et al.

(10) Patent No.: US 7,383,986 B2
(45) Date of Patent: Jun. 10, 2008

(54) INTEGRATED CLAM SHELL PC PLATFORM

(75) Inventors: Paul E. Specht, Glenview, IL (US); John Wawryk, Arlington Heights, IL (US)

(73) Assignee: Block and Company, Inc., Wheeling, IL (US)

( * ) Notice: Subject to any disclaimer, the term of this patent is extended or adjusted under 35 U.S.C. 154(b) by 790 days.

(21) Appl. No.: 10/931,710

(22) Filed: Sep. 1, 2004

(65) Prior Publication Data

US 2006/0055292 A1 Mar. 16, 2006

(51) Int. Cl.
*G06Q 40/00* (2006.01)

(52) U.S. Cl. ....................................... 235/379; 235/383

(58) Field of Classification Search ................ 235/383, 235/381, 379; 186/59, 61; 705/16
See application file for complete search history.

(56) References Cited

U.S. PATENT DOCUMENTS

| | | | | | |
|---|---|---|---|---|---|
| 4,208,081 | A | * | 6/1980 | Kekas et al. | 439/374 |
| 5,174,399 | A | * | 12/1992 | Brauneis | 177/25.15 |
| 5,311,397 | A | * | 5/1994 | Harshberger et al. | 361/683 |
| 5,594,920 | A | * | 1/1997 | Ebina et al. | 705/24 |
| 5,756,978 | A | | 5/1998 | Soltesz et al. | |
| 5,838,541 | A | | 11/1998 | Mesfin et al. | |
| 6,018,456 | A | | 1/2000 | Young et al. | |
| 6,206,285 | B1 | * | 3/2001 | Baitz et al. | 235/380 |
| 6,335,861 | B1 | | 1/2002 | Ramsey, III et al. | |
| 2005/0242172 | A1 | * | 11/2005 | Murata Sadao | 235/380 |
| 2006/0065721 | A1 | * | 3/2006 | Addison et al. | 235/383 |

OTHER PUBLICATIONS

Product Bulletin for CashierPlus Platform from MMF Cash Drawer Company, Feb. 2004.

Product Bulletin for MediaPlus Enclosure from MMF Cash Drawer Company, Feb. 2004.

* cited by examiner

*Primary Examiner*—Ahshik Kim
(74) *Attorney, Agent, or Firm*—Cook, Alex, McFarron, Manzo, Cummings & Mehler, Ltd.

(57) ABSTRACT

A POS platform includes a substantially closed housing adapted to be seated on top of an associated cash drawer, with a first opening that is sized to receive the PC. The housing also has at least one second opening for permitting passage of cables between the PC and the peripherals. A top support is provided that has an upper surface with discrete areas for supporting the peripherals and at least one hole therein to permit passage of the cables between the peripherals and the PC. A hinge is provided for connecting the top support to the housing to permit the top support to pivot with respect to the housing, thus facilitating access to the PC and the cables connecting the PC and the peripherals.

7 Claims, 3 Drawing Sheets

INTEGRATED CLAM SHELL PC PLATFORM

The present invention relates to point-of-sale systems and, more particularly, to an integrated housing and platform for organizing and mounting a cash drawer and its associated PC and peripherals.

Point-of-sale (POS) systems comprising a cash drawer and associated PC and peripherals, such as a keyboard, a printer, and a display or monitor, are known in the retail industry for use at assisted (i.e., clerk-operated) checkout terminals. Housings and platforms have been associated with such POS terminals. However, such housings and platforms typically have not made provision for the PC, thus requiring the use of additional floor space or other surface area to support the PC. In addition, housings have not facilitated access to the cables that interconnect the cash drawer, the PC and the peripherals, thus complicating the set-up and servicing of POS terminals.

Accordingly, it is an object of the present invention to provide an integrated housing and support for a POS terminal.

More specifically, it is an object of the present invention to provide an integrated housing and support for a POS terminal that permits mounting of the PC with respect to the cash drawer, supports the peripherals, and facilitates access to the cables interconnecting the various components for set-up and service.

SUMMARY OF THE INVENTION

These objects, as well as other which will become apparent upon reference to the following detailed description and accompanying drawings, are accomplished by a POS platform that includes a substantially closed housing. The housing is adapted to be seated on top of the associated cash drawer and includes a first opening that is sized to receive the PC. The housing also has at least one second opening for permitting passage of cables between the PC and the peripherals. A top support is provided that has an upper surface with discrete areas for supporting the peripherals and at least one hole therein to permit passage of the cables between the peripherals and the PC. A hinge is provided for connecting the top support to the housing to permit the top support to pivot with respect to the housing, thus facilitating access to the PC and the cables interconnecting the PC and the peripherals.

In a preferred embodiment, the walls that comprise the housing may be perforated to permit ventilation of the PC. Further, the housing has a footprint substantially corresponding the cash drawer. The floor of the housing may include a fixed or movable tab for locating the PC. The top support includes the surface adapted to seat a keyboard, the surface being inclined downwardly toward a front edge. The inclined surface includes depressions for locating a keyboard and the front edge of the platform includes a lip that extends generally upwardly therefrom.

DETAILED DESCRIPTION

Figure 1:
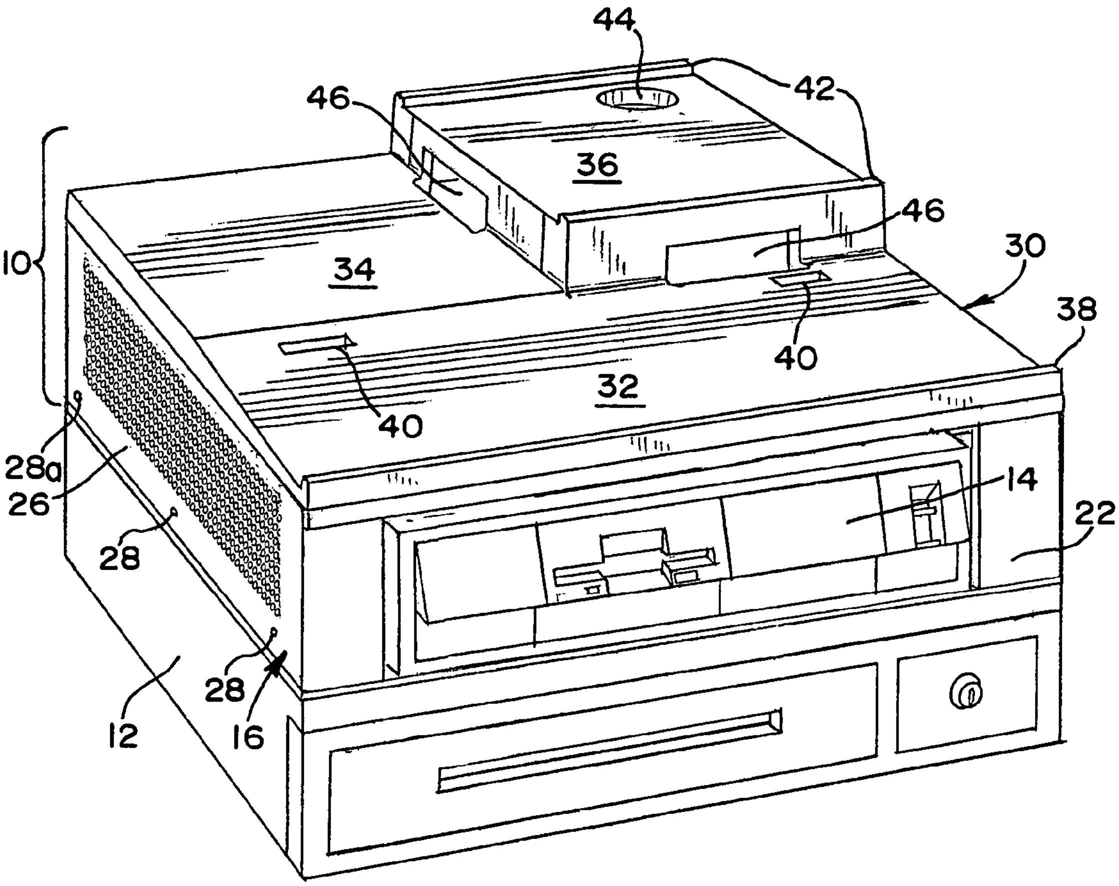
FIG. 1 is a perspective view of an integrated housing and platform according to the present invention shown mounted to a cash drawer, with the PC located in the housing.
Figure 2:
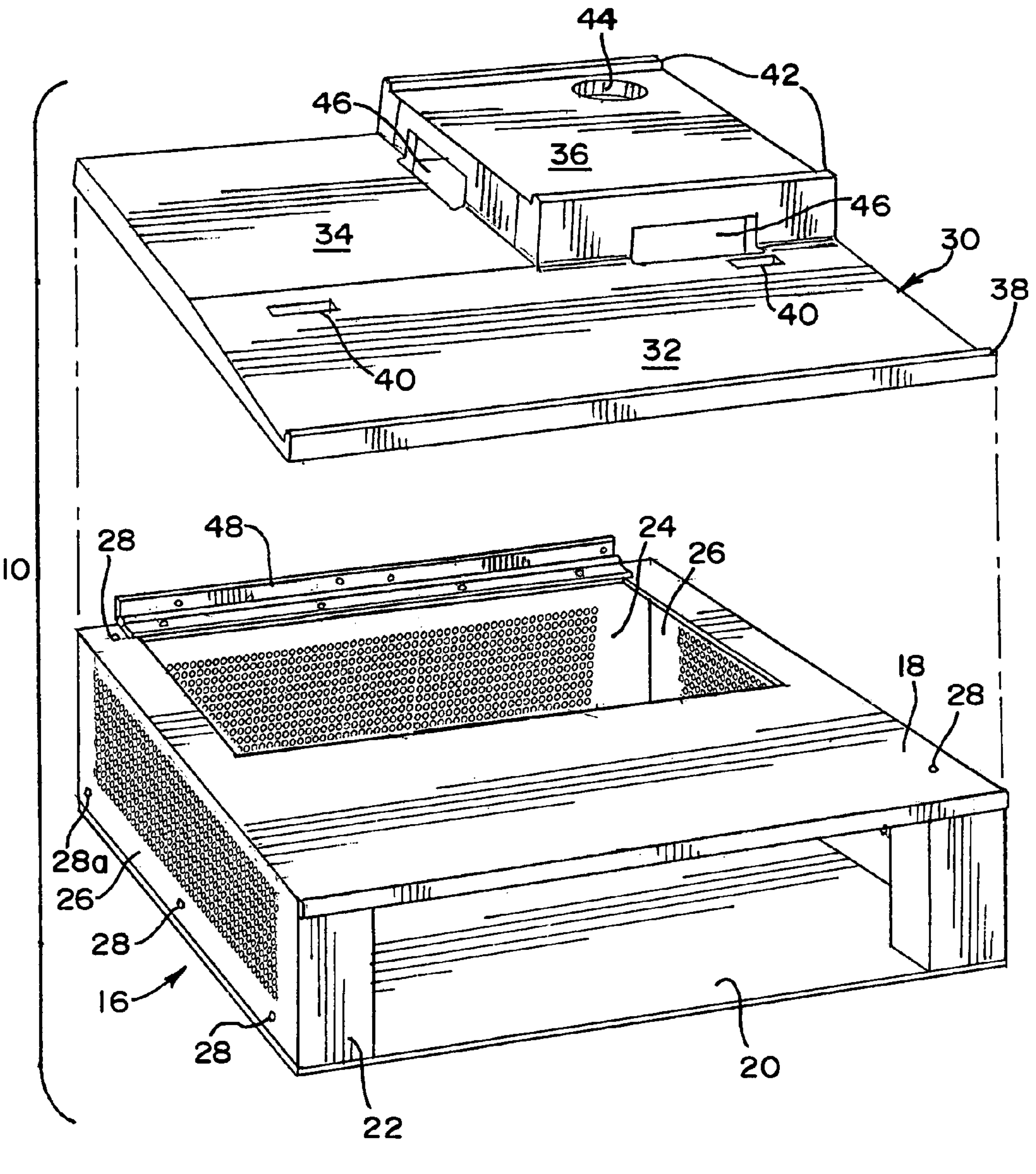
FIG. 2 is an exploded perspective view of the housing and platform according to the present invention.
Figure 3:
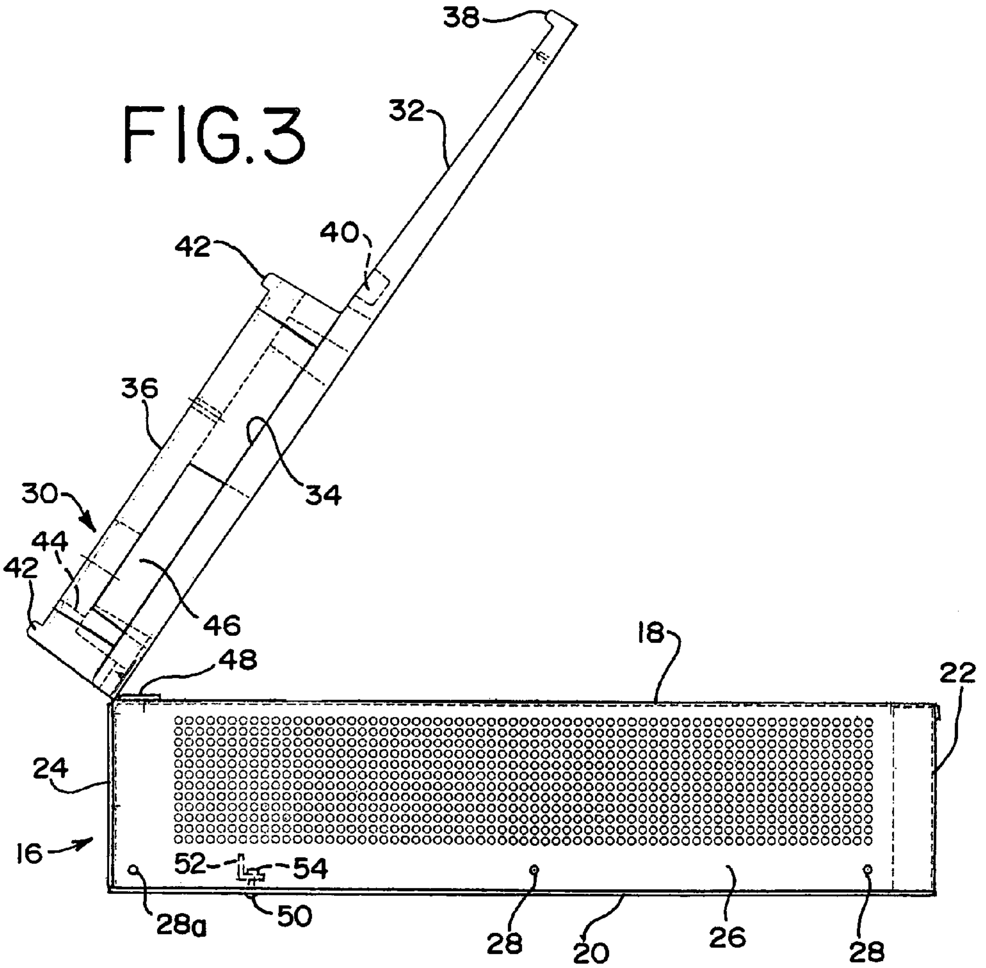
FIG. 3 is a side view of the integrated housing and platform according to the present invention with the platform pivoted with respect to the housing.
Figure 4:
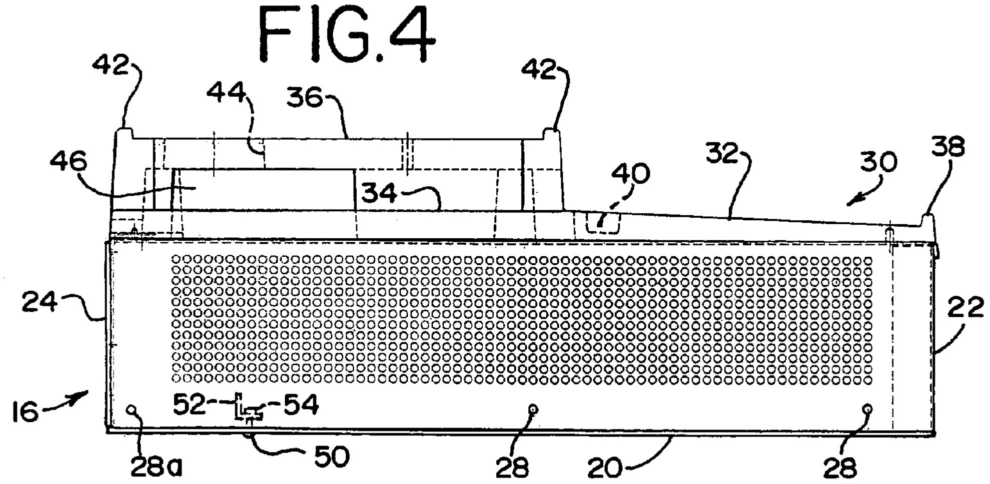
FIG. 4 is a side view of the integrated housing and platform of the present invention with the platform resting on top of the housing.

Turning to the figures of the drawings, there is seen in FIG. 1 an integrated housing and platform system, generally designated 10, for use with a POS terminal. The POS terminal typically comprises a cash drawer 12, a PC 14 and peripheral components. As used herein, “peripheral components” or “peripherals” refer to keyboards, printers, and displays or monitors (none of which are shown) that may be used in the POS terminal.

The system 10 includes a housing 16 adapted to be mounted on top of the cash drawer 12 for holding the PC 14. The housing 16 has six sides, including a top 18 and a bottom 20 which have a size and shape to match the top surface or footprint of the cash drawer 12, so that the system 10 presents a unitary appearance when located on top of the cash drawer 12. The front side of the housing 16 includes an opening 22 sized to receive the PC 14. The back 24 and the opposed sides 26 of the housing are perforated to facilitate ventilation of the PC. As illustrated, the top 18, bottom 20, and front 22/back 24/sides 26 are made of three separate pieces of metal sheet which are secured to each other by, e.g., screws 28. The rear-most screws **28*a* that secure the sides 26 to the bottom 20 are located such that, if the other screws 28** securing the sides to the base are not in place, the top/front/back/sides of the housing can pivot as a unit with respect to the bottom, thus further facilitating the set-up and/or servicing of the POS system.

The bottom 20 may also include a tab or stop for locating the PC in the housing. Specifically, two or more studs 50 may be secured through the bottom of the housing equidistantly from the back so that their heads are flush with the bottom and their threaded shafts extend into the interior of the housing. The studs 50 carry an elongated L-shaped bracket 52 so that one edge extends vertically to form a stop for the PC as it is slid into the housing from the opening in the front. The L-shaped bracket 52 may have holes for receiving the shafts of the studs 50, in which case the location of the stop formed thereby is fixed. Alternatively, the L-shaped bracket 52 may include slots for receiving the shafts of the studs 50 so that the spacing of the L-shaped bracket 52 with respect to the back of the housing may be adjusted to accommodate PCs of different depth. Once located, the L-shaped bracket 52 is secured in place by, e.g., nuts 54 that are received on the threaded shafts of the studs 50.

A top support 30 is secured to the top 18 of the housing 16. The support 30 includes three discrete sections, each adapted to support a specific peripheral component: a front, downward sloping section 32 for supporting a keyboard; a first, flat or horizontal section 34 for supporting a receipt printer; and a second, raised flat or horizontal section 36 for supporting a monitor.

The keyboard support section 32 includes a front lip 38 and two recesses 40 adapted to receive the feet of the keyboard. Together, the lip 38 and the recesses 40 help to maintain the keyboard in position on the support 30.

The raised support section 36 includes front and back lips 42 to help maintain a monitor thereon. The raised section 36 includes a hole 44 through which cable connecting the monitor to the PC and power cords may pass. Optionally, a pole-mounted monitor may be used with the pole mount being received in the hole 44 in the raised section 36. The raised section 36 also includes slots 46 in the side walls thereof for passage of cables between the keyboard, the printer, and the PC 14.

In keeping with the invention, the top support 30 is secured to the housing 16 so as to facilitate access to the interconnecting cables of the POS system for set-up and service. To this end, the top support 30 is secured to the housing 16 by a hinge 48. The hinge 48 is located close to the area where the interconnecting cables pass through the housing 16 and top support 30, so as to minimize pulling on the cables as the support is raised. Thus, the hinge 48 allows the platform 30 to pivot with respect to the housing 16, like a "clam shell," to provide access to the underside of the platform 30 and the interior of the housing. As illustrated, the hinge 48 is located at the back of the housing and support. However, the hinge could also be located on a side without departing from the invention. In addition, the illustrated hinge 48 is a piano-type hinge that runs substantially the full width of the support 30 and housing 16. Smaller hinges could be used without departing from the invention.

Thus, an integrated housing and support for a POS terminal has been provided that meets all the objects of the present invention. While the invention has been described in terms of a preferred embodiment, there is no intent to limit the invention to the same. Instead, the invention is defined by the scope of the following claims. While the support has been described as having depressions for locating and supporting various peripherals that may be carried thereon, additionally, or alternatively, hook and loop fasteners, double-sided tape, releasable adhesives, or mechanical fasteners (screws, brackets, etc.) could be used to help maintain the peripherals in place on the top support.

That which is claimed:

1. A POS platform for mounting a PC on an associated cash drawer and for supporting peripherals, the platform comprising:

a substantially closed housing, the housing being adapted to seat on top of the associated cash drawer and having a first opening sized to receive the PC and at least one second opening sized to permit routing of cables between the PC and the peripherals;

a top support having an upper surface with discreet areas for supporting the peripherals and having at least one passageway therein to permit routing of cables between the peripherals and the PC; and a hinge connecting the top support to the housing to permit the top support to pivot with respect to the housing to facilitate access to the PC and the cables connecting the PC and the peripherals.

2. The POS platform of claim 1 wherein the housing further comprises a plurality of walls which are perforated to permit ventilation of the PC.

3. The POS platform of claim 1 wherein the housing comprises six sides with one side having the first opening, the housing having a footprint substantially corresponding to the cash drawer.

4. The POS platform of claim 3 wherein one of the sides comprises a floor, the floor including tabs for locating the PC.

5. The POS platform of claim 3 wherein three of the sides comprise side walls which are perforated to permit ventilation of the PC.

6. The POS platform of claim 3 wherein one of the sides comprises a top wall, the top wall having the at least one second opening.

7. The POS platform of claim 1 wherein one of the discreet areas of the top support has a front portion adapted to seat a keyboard and comprises a surface inclined downwardly toward a front edge, a lip extending generally upwardly from the front edge, and recesses for locating the keyboard.

* * * * *